United States Patent
Luce

(10) Patent No.: US 6,840,099 B2
(45) Date of Patent: Jan. 11, 2005

(54) DEVICE FOR COMMUNICATION BETWEEN A VEHICLE AND ONE OF ITS WHEELS

(75) Inventor: Dominique Luce, Toulouse (FR)

(73) Assignee: Siemens VDO Automotive, Toulouse (FR)

(*) Notice: Subject to any disclaimer, the term of this patent is extended or adjusted under 35 U.S.C. 154(b) by 0 days.

(21) Appl. No.: 10/395,155

(22) Filed: Mar. 25, 2003

(65) Prior Publication Data

US 2003/0192373 A1 Oct. 16, 2003

(30) Foreign Application Priority Data

Apr. 16, 2002 (FR) .............................................. 02 04729

(51) Int. Cl.$^7$ .............................................. G01M 17/02
(52) U.S. Cl. ...................................................... 73/146
(58) Field of Search ................................. 73/146, 146.8

(56) References Cited

U.S. PATENT DOCUMENTS 5,844,131 A * 12/1998 Gabelmann et al. ....... 73/146.8
5,987,980 A    11/1999 Mangafas et al.
6,340,929 B1    1/2002 Katou et al.

FOREIGN PATENT DOCUMENTS

EP            1 002 670        5/2000

* cited by examiner

*Primary Examiner*—Edward Lefkowitz
*Assistant Examiner*—Andre Allen
(74) *Attorney, Agent, or Firm*—Young & Thompson

(57) ABSTRACT

A device for communication between a vehicle and one of its wheels comprises a housing (13) containing an electronic circuit (18) and capable of pressing against a rim (21) of the wheel during fitting of a valve (10) to said rim. The housing comprises at least one tooth (16, 17) connected electrically to the electronic circuit and capable of scratching the surface of the valve during fitting of the valve to the rim.

12 Claims, 2 Drawing Sheets

DEVICE FOR COMMUNICATION BETWEEN A VEHICLE AND ONE OF ITS WHEELS

Figure 1:
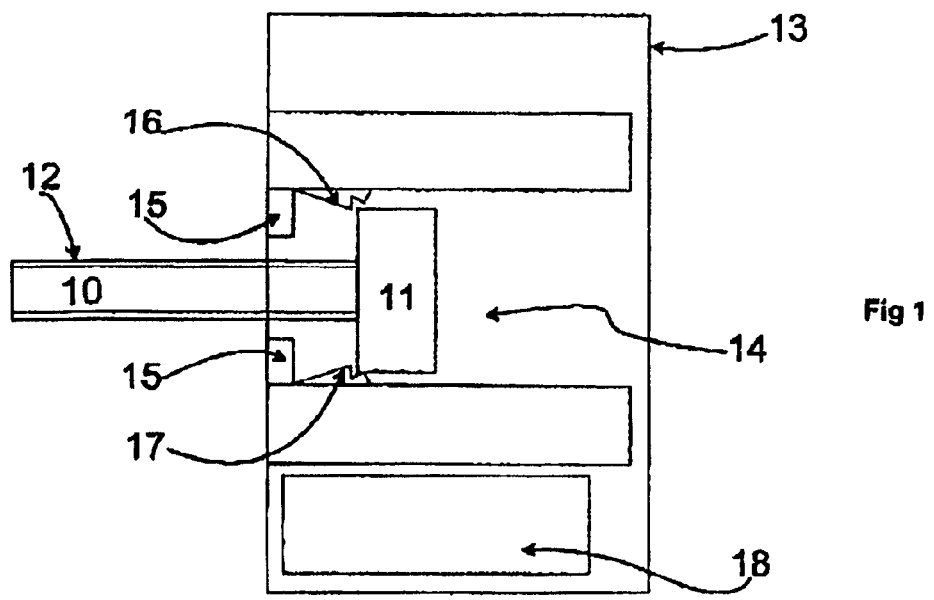

This invention relates to a device for communication between a vehicle and one of its wheels. It particularly applies to the communication of data about the pressure and/or temperature of a tire.

A tire pressure monitoring system comprises, mounted on the wheel of the vehicle in question, a pressure sensor and a radiofrequency transmitter that uses the valve of the tire as a transmitting antenna. Valves usually have an insulating layer on the surface. To establish contact between the transmitter and the valve it is known practice to partially treat the surface of the valve to make it conducting. This has numerous drawbacks. The treatment of the valve surface is expensive and unsuitable for cases in which it is necessary to leave a freedom of relative angular movement between the transmitter and the valve.

It is an object of this invention to overcome these drawbacks.

To this end the subject of the present invention is a device for communication between a vehicle and one of its wheels, comprising a housing containing an electronic circuit and capable of pressing against a rim of said wheel during fitting of a valve to said rim, which device is characterized in that said housing comprises at least one tooth connected electrically to said electronic circuit and capable of scratching the surface of the valve during fitting of the valve to said rim.

As a result of these arrangements, the insulating layer of the valve is locally removed at the point of contact between the tooth and the rim. This ensures good conduction between the valve and the tooth and, consequently, between the valve and the transmitter circuit, without requiring any special machining of the valve.

In accordance with certain particular features, said housing comprises a pair of teeth positioned one on each side of the valve during fitting of the valve to the rim.

As a result of these arrangements, the tolerances in the positioning of the valve and of the housing do not prevent the teeth from scratching the surface of the valve.

In accordance with certain particular features, provision is made for a relative rotation of the valve and of the housing and, when the valve is fully screwed home, each tooth is near or on the axis of rotation of said relative rotation. As a result of these arrangements, the tooth exerts little or no torque to oppose the relative movement of the valve and housing.

In accordance with certain particular features, at least one tooth is made of stainless steel or any other metal that is a good conductor of electricity and has a hardness greater than the material of the valve. As a result of these arrangements, the tooth is harder than the valve, which is generally made of aluminum.

In accordance with certain particular features, at least one tooth possesses an opening capable of receiving a chip produced by the scratching of the valve by said tooth. As a result of these arrangements, there is no risk that the chip will cause damages to the circuits, tire or sensor employed.

In accordance with certain particular features, at least one tooth has a larger dimension parallel to the direction of relative displacement of the valve. As a result of these arrangements, the tooth cannot easily be deformed by the pressure exerted by the valve.

In accordance with certain particular features, at least one tooth is basically pyramid-shaped. As a result of these arrangements, the tooth cannot easily by deformed by the force exerted by the valve on its point.

In accordance with certain particular features, at least one tooth is in the form of two half-pyramids having triangular bases, with different heights so that an opening is left between them. Said tooth is thus well able both to scratch the surface of the valve and also to receive any chip produced by the biting action.

In accordance with certain particular features, at least one tooth is formed by stamping, the stamping action producing a tear in part of said tooth.

As a result of these arrangements, the edge of the tear can serve to scratch the surface of the valve and, if a chip is produced by the scratching action, the chip would be taken into the volume of the tooth.

In accordance with certain particular features, the housing is of a shape suitable for surrounding each tooth in such a way as to substantially prevent the circulation of air. As a result of these arrangements, oxidation of the area of contact between the tooth and the valve is limited.

Figure 2:
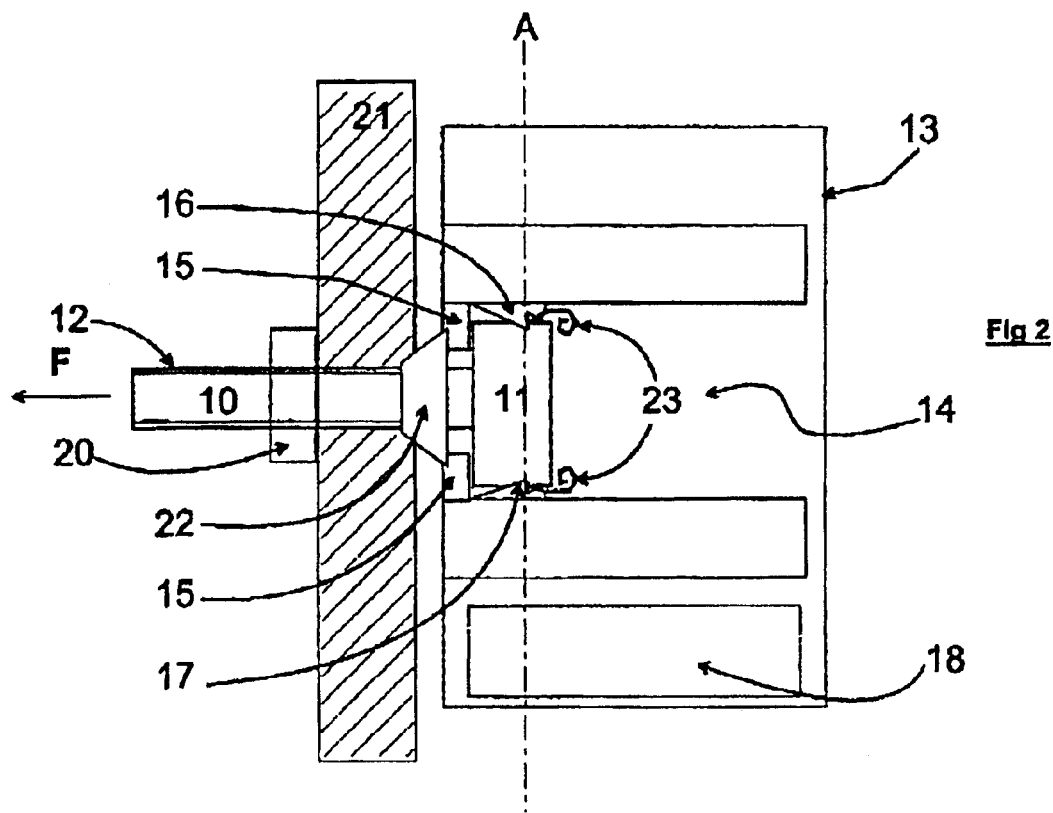
Figure 3:
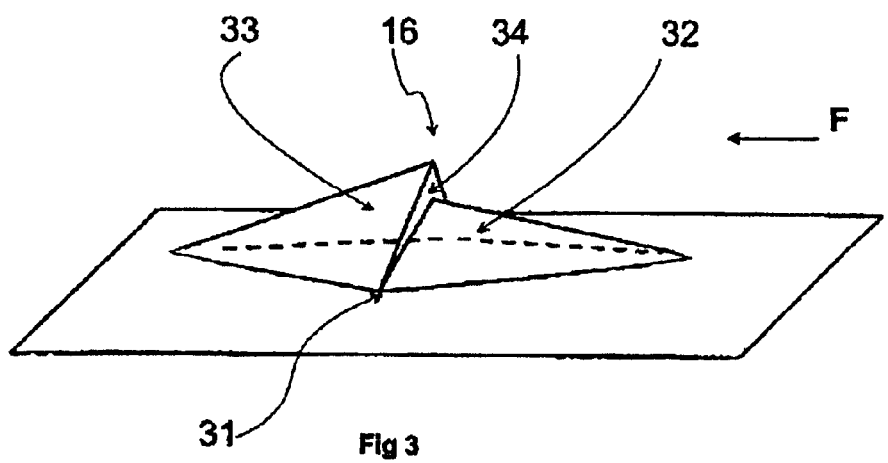

Other advantages, objects and features of the present invention will become clear in the course of the following description, which refers to the appended drawings in which:

FIG. 1 is a schematic cross section through a housing in accordance with the present invention and a valve before it is fitted to a rim, FIG. 2 shows the same schematic cross section as in FIG. 1 after fitting to a rim, FIG. 3 is a schematic view of a tooth on a component providing electrical connection between the valve and an electronic circuit incorporated in the housing illustrated in FIGS. 1 and 2, and FIGS. 4a and 4b are two schematic elevations (from the front and rear respectively) of the connection component comprising the tooth shown schematically in FIG. 3.

Seen in FIG. 1 is a valve 10 that has a base 11 with several faces and a screwthread 12, an electronic housing 13 with a central opening 14 adapted to the shape of the base 11 of the valve 10, a seat 15 in the central opening 14, and two teeth 16 and 17.

The electronic housing 13 contains an electronic circuit 18. For example, the electronic circuit 18 includes a sensor (not shown) for sensing pressure or temperature and a radiofrequency transmission means (not shown) for transmitting messages representing the pressure and/or temperature sensed by the sensor. The electronic circuit is connected electrically to the teeth 16 and 17 by means, one example of which is detailed in FIGS. 4a and 4b.

The valve 10 is of a type known in the automobile industry. The screwthread 12 takes a nut 20 (see FIG. 2) for mounting the valve 10 on a wheel rim 21 of a vehicle (not shown). The screwthread 12 is also used to carry a protective plug (not shown), which is usually made of plastic.

The central opening 14 of the electronic housing 13 is capable of receiving the valve 10 and preventing relative rotation of the electronic housing 13 about the axis of rotation of the valve 10. For example, if the valve base 11 has six faces, the central opening 14 preferably has the same number of internal faces.

The seat 15 of the central opening 14 will not allow the base 11 through its opening. The seat 15 therefore enables the electronic housing 13 to be tightened up against the rim 21 when the electronic housing 13 and the valve 10 are fitted to the rim. In the position seen in FIG. 1, before the valve 10 and electronic housing 13 are fitted to the rim 21, the teeth 16 and 17 project further in from the inside walls of the central opening 14, each facing the other forward of the base 11 of the valve 10, toward the seat 15. In the course of fitting, the valve 10 is pulled toward the seat 15 (arrow F FIG. 2) by the rotation of the nut 20 about the screwthread 12 and the base 11 is forced between the teeth 16 and 17.

It can be seen in FIG. 2 that the electronic housing 13 and the valve 10 are fitted to the rim 21 by tightening the nut 20 along the thread 12 downstream of the rim 21. A seal 22 separates the electronic circuit 13 from the rim 21. The base 11 of the valve 10 contacts the seat 15 of the central opening 14. The base 11 of the valve 10 has been scratched or peeled open by the teeth 16 and 17 and a chip of metal 23 has formed where the tooth, 16 or 17, is in contact with the valve 10. In certain embodiments (see FIGS. 3 and 4), each tooth contains an opening to receive the chip 23 formed by the scratching or peeling action.

Because of the tearing away of material from the base 11, the insulating surface treatment of the base 11 is torn away and an electrical contact is established between each tooth and the valve 10 so that the signals emitted by the transmission means of the electronic circuit 18 are carried by the valve 10 acting as a transmission antenna for the signals.

It will be observed that the relationship between the valve 10 and the electronic housing 13 does not prevent a movement of small amplitude about an axis A lying transversely to the axis of the valve 10 and passing through the points of contact between the base 11 and each of the teeth 16 and 17.

It will be observed too that the central opening 14 forms, for the areas of contact between the valve and the teeth, a housing which at least partly prevents oxidation of these contact areas.

It will be observed, in FIG. 3, that in one embodiment a tooth, in this case the tooth 16, is basically pyramid-shaped, its base 31 being of a diamond shape in which the longer diagonal is parallel to the direction F of relative displacement of the base 11 of the valve 10 during fitting.

Because of the diamond shape of the base 31 (though any other elongate shape of the same type, such as an ellipse, is possible), the tooth 16 possesses, in a first cross section parallel to the direction of relative displacement of the valve, a first basically triangular shape having a first base (the long diagonal of the diamond) and, in a second section perpendicular to the first, a second basically triangular shape with a second base (the short diagonal of the diamond) that is smaller than said first base.

More precisely, the tooth 16 is in the shape of two half-pyramids 32 and 33 of different heights, their bases being the upstream and downstream halves of the above-mentioned diamond. The half-pyramid 32, which is upstream in the direction of displacement of the base 11 during fitting, is not as tall as the downstream half-pyramid 33 and as a result the opening 34 (tear) created between the two half-pyramids is open toward the base 11 during its progression. As the chip 23 is formed by the scratching action of the half-pyramid 33, it passes into the opening 34.

It will be observed that the tooth 16 can be formed simply by stamping a sheet of metal designed to form an electrical connection component 35 (see FIGS. 4a and 4b) connecting the valve 10 to the electronic circuit 18. Where this method is adopted, the stamping creates a tear (opening) 34 between the two half-pyramids. This opening advantageously receives any chip produced by the scratching of the surface of the valve base 11.

Figure 4A:
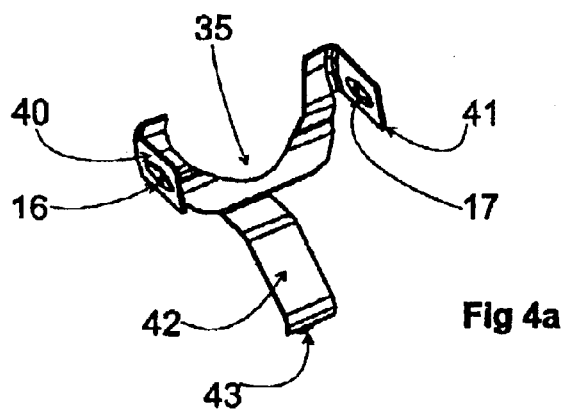
Figure 4B:
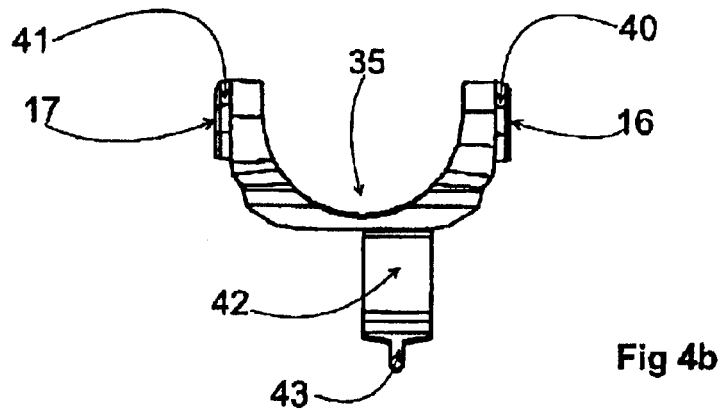

In FIGS. 4a and 4b it can be seen that the connection component 35 has three arms 40, 41 and 42 in a star arrangement. The teeth 16 and 17 are on the arms 40 and 41, respectively, which leave an unoccupied semicircular opening for the base 11 of the valve 10 to pass through. The arm 42 has a pin 43 capable of being connected, e.g. by soldering, to the electronic circuit 18.

In certain embodiments the teeth are made of stainless steel, making them harder than the valve material, which is generally aluminum.

What is claimed is:

1. A device for communication between a vehicle and one of its wheels, comprising:

a housing (13) containing an electronic circuit (18) and capable of pressing against a rim (21) of said wheel during fitting of a valve (10) to said rim, said housing having at least one tooth (16, 17) connected electrically to said electronic circuit and that scratches a surface of the valve during fitting of the valve to said rim.

2. The device as claimed in claim 1, wherein said housing (13) comprises a pair of said teeth (16, 17) positioned one on each side of the valve (10) during fitting of the valve (10) to the rim (21).

3. The device as claimed in claim 1, wherein said valve (10) is rotatable relative to the housing (13) and, when the valve is fully screwed home, each said tooth (16, 17) is near or on the axis of rotation (A) of said relative rotation.

4. The device as claimed in claim 1, wherein said at least one tooth (16, 17) is made of stainless steel.

5. A device for communication between a vehicle and one of its wheels, comprising:

a housing (13) containing an electronic circuit (18), the housing abutting a rim (21) of a wheel during fitting of a valve (10) to the rim, said housing having at least one tooth (16, 17) connected electrically to said electronic circuit and that scratches a surface of the valve during fitting of the valve to the rim, wherein said at least one tooth (16, 17) possesses an opening (34) that receives a chip (23) produced by the scratching of the valve by said at least one tooth.

6. The device as claimed in claim 1, wherein said at least one tooth (16, 17) has a larger dimension parallel to the direction of relative displacement of the valve.

7. The device as claimed in claim 1, wherein said at least one tooth (16, 17) is basically pyramid-shaped.

8. The device as claimed in claim 1, wherein said at least one tooth (16, 17) is made up of two half-pyramids (32, 33) having triangular bases, with different heights so that an opening (34) is left between them.

9. The device as claimed in claim 1, wherein said at least one tooth (16, 17) is formed by stamping, the stamping action producing a tear (34) in part of the said at least one tooth.

10. The device as claimed in claim 1, wherein said housing (13) is of a shape suitable for surrounding each tooth (16, 17) in such a way as to substantially prevent the circulation of air.

11. A device for transmitting a signal from a wheel of a vehicle, the device comprising:

an air valve for a wheel;

a fitting that is attached to said valve;

an electronic circuit attached to said fitting that senses a wheel parameter and transmits a signal that communicates the sensed wheel parameter; and an electrically conductive tooth attached to said fitting and that is electrically connected to said electronic circuit, said tooth extending beneath a surface of said valve so that said valve is a transmitting antenna for said electronic circuit.

12. The device of claim 11, wherein said tooth comprises an opening that receives a portion of said valve removed by extension of said tooth beneath the surface of said valve.

* * * * *